(12) United States Patent
Shkolnikov et al.

(10) Patent No.: US 8,667,271 B2
(45) Date of Patent: Mar. 4, 2014

(54) METHODS AND SYSTEMS TO RESOLVE MESSAGE GROUP

(75) Inventors: Pavel Shkolnikov, Waterloo (CA); Ian Douglas Sangster, Toronto (CA); Andrew John Mackie, Waterloo (CA)

(73) Assignee: Blackberry Limited, Waterloo (CA)

( * ) Notice: Subject to any disclaimer, the term of this patent is extended or adjusted under 35 U.S.C. 154(b) by 1018 days.

(21) Appl. No.: 12/474,473

(22) Filed: May 29, 2009

(65) Prior Publication Data
US 2010/0017607 A1    Jan. 21, 2010

Related U.S. Application Data

(60) Provisional application No. 61/080,922, filed on Jul. 15, 2008.

(51) Int. Cl.
*H04L 29/06* (2006.01)

(52) U.S. Cl.
USPC ............................ 713/163; 713/154; 713/160

(58) Field of Classification Search
USPC .................................. 713/162, 154, 160, 163
See application file for complete search history.

(56) References Cited

U.S. PATENT DOCUMENTS

| | | | |
|---|---|---|---|
| 5,974,452 A | 10/1999 | Karapetkov et al. | |
| 6,396,830 B2 * | 5/2002 | Aravamudan et al. | 370/356 |
| 6,816,884 B1 | 11/2004 | Summers | |
| 6,912,519 B2 | 6/2005 | Shouji | |
| 7,131,003 B2 * | 10/2006 | Lord et al. | 713/168 |
| 2001/0049747 A1 * | 12/2001 | Stanbach | 709/245 |
| 2002/0049751 A1 | 4/2002 | Chen et al. | |
| 2002/0112015 A1 | 8/2002 | Haynes | |
| 2002/0120695 A1 | 8/2002 | Engstrom | |
| 2002/0141560 A1 | 10/2002 | Khayatan et al. | |
| 2004/0093382 A1 | 5/2004 | Kulkarni | |
| 2004/0215823 A1 * | 10/2004 | Kleinfelter et al. | 709/245 |
| 2006/0204011 A1 | 9/2006 | Adams et al. | |
| 2007/0130464 A1 | 6/2007 | Swedor et al. | |
| 2007/0180033 A1 | 8/2007 | Singh et al. | |
| 2008/0183827 A1 * | 7/2008 | Rege et al. | 709/206 |

FOREIGN PATENT DOCUMENTS

| | | |
|---|---|---|
| CA | 2511146 A1 | 12/2005 |
| CA | 2628314 A1 | 3/2008 |
| EP | 1333693 A1 | 8/2003 |
| EP | 1655693 A1 | 5/2006 |
| EP | 1962461 A1 | 8/2008 |

OTHER PUBLICATIONS

Extended European Search Report for European Application EP 09161507.0 dated Aug. 4, 2009.
Canadian Intellectual Property Office, "Requisition by the Examiner" for Canadian Patent Application No. 2,667,733, dated Aug. 27, 2013, Canada.

\* cited by examiner

*Primary Examiner* — Mohammad W Reza
(74) *Attorney, Agent, or Firm* — Ridout & Maybee LLP

(57) ABSTRACT

A method and system for resolving addresses of a message including looking up, from a source directory, a group name associated with a message address of the message, looking up through a cache of user names mapped to user addresses, a user address for each of the looked up user names and returning an associated user address, and addressing the message to each looked up user addresses. Expanding group address by looking up user name in for group from source directory, looking up user address for each user name from user cache, addressing message to looked up user, address, and transmitting message to looked up user address.

17 Claims, 10 Drawing Sheets

METHODS AND SYSTEMS TO RESOLVE MESSAGE GROUP

CROSS REFERENCE TO RELATED APPLICATIONS

This application claims priority from, and is entitled to the benefit of the filing date of U.S. patent application No. 61/080,922 entitled METHODS AND SYSTEMS TO RESOLVE MESSAGE GROUP filed Jul. 15, 2008. The content of the above application is hereby incorporated by reference into the detailed description hereof.

BACKGROUND

The present description relates to messaging applications that send and receive messages and, in particular, to methods and systems for resolving a message group.

Message addresses are often organized in groups to identify message addresses to which certain information should be sent. Such groups can provide authentication for the message address to ensure that only those that are authorized to receive the message receive a message. For example, financial information about a company may be authorized for only an executive group of the company. A message address group entitled "Executive" could be set up on a message server of the company. Whenever a message is to be sent to the "Executive" group then a message server is instructed to resolve the members of the group and send the message to each of them. This process can be resource intensive resulting in degradation of system performance.

It would be advantageous for there to exist improved or alternative methods and systems for the expansion of a message group.

BRIEF DESCRIPTION OF THE DRAWINGS

Reference will now be made, by way of example, to the accompanying drawings which show example embodiments of the present invention, and in which.

Similar reference numerals may have been used in different figures to denote similar components.

DESCRIPTION OF EXAMPLE EMBODIMENTS

Figure 1:
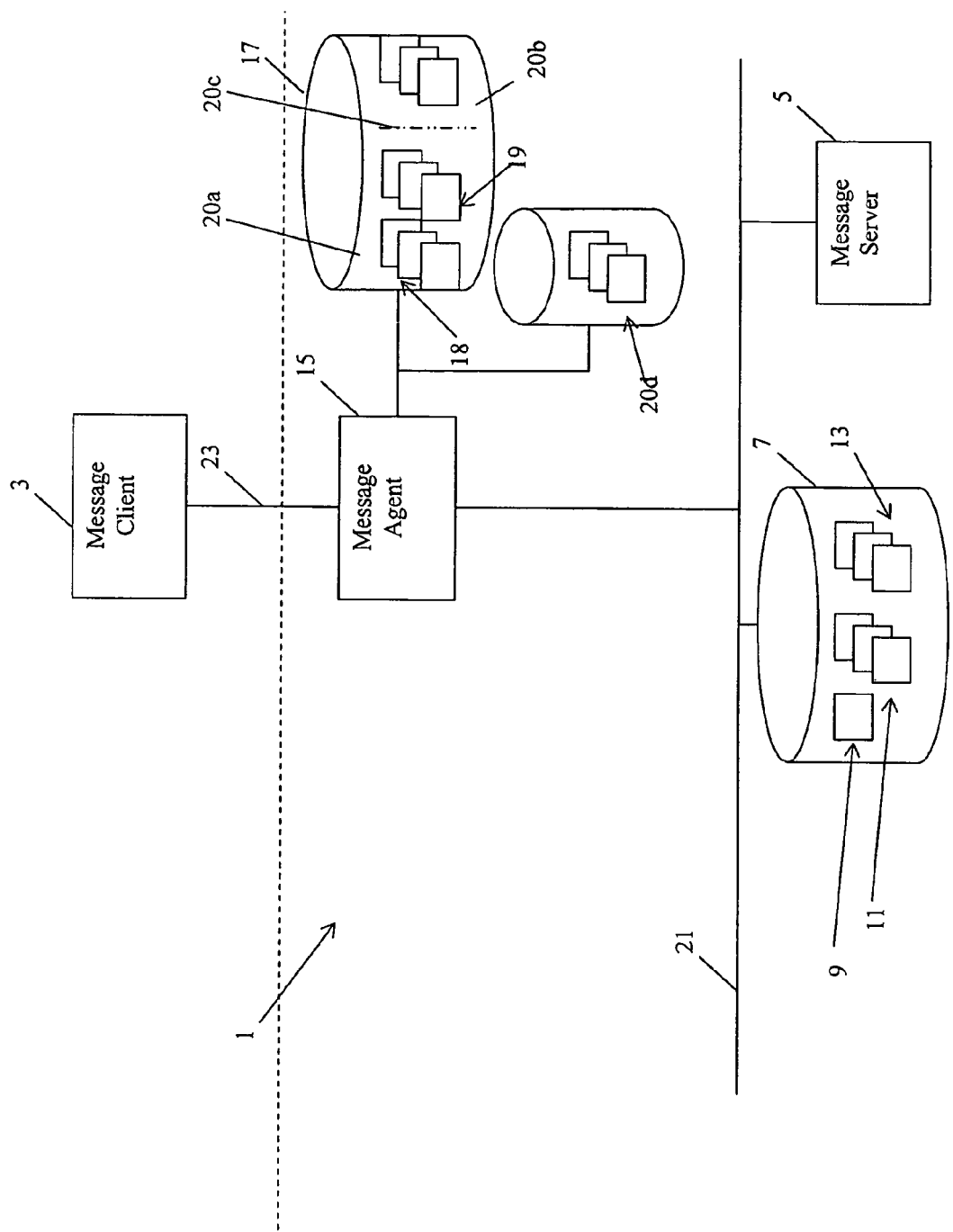
FIG. 1 shows a block diagram of a message client and a system to which an example embodiment of an aspect of the present invention can be applied, in conjunction with further example details that could be utilized are provided in the remaining FIGS.

The problem of consumption of system resources for group message resolution is especially true where a message is to be encrypted as additional steps are required to resolve the group and also to obtain required encryption information for individual members, such as an encryption key. This can multiply when groups are nested within other groups. Also, some message servers are unable to resolve group addresses for messages to be encrypted. This means that the group must be resolved prior to sending the message to the server for encryption and transmission, which results in numerous calls to the server.

The present description relates to telecommunications systems, including multimedia telecommunications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, link or method for conveying information or signals, and are often functionally equivalent. Such functional equivalents are included within the scope of this description. The terms "interconnected" and "operatively coupled" are intended to refer interchangeably to a connection between components that allows data to pass therebetween, perhaps through one or more intermediate components.

In this description, reference is made to certain terms as follows: A "source directory" refers to a database of information that is defined to be current. A "cache" reflects a snapshot of information from the source directory that may be out of date since the snapshot was taken. A "user name" is the name recognized by a server for obtaining associated information about a user, including a user address and, possibly, a user encryption key. The "user encryption key" may be for example a public key used for encryption of a message to be decrypted by a separate private encryption key provided by the user when attempting to decrypt a message. The user encryption key may be associated with a digital certificate. Other forms of encryption may also be used apart from public key/private key encryption.

Any references herein to "messages" are not intended to be limited to e-mail, but should be understood to include other types of messages that one skilled in the art would understand to be possible in the context in which the term is being used. Other types of messages may include, for example, text messages, audio messages, video messages, SMS messages and other items, including calendar entries, tasks, and other date-related items.

For simplicity this description will be made with reference to message addresses with a format that has two portions and an @ symbol at the dividing point between the two portions. For the purposes of this description message addresses can be user addresses or group addresses.

For a user address, one portion is typically the user name that is set up with an address provider, for example a network administrator, and stored in the source directory for use by the server. Information about the user is mapped to the user name in the source directory, such as for example a user address and encryption key. The user name is frequently in the form of the name or nickname of the person associated with the user address. The second portion identifies the host name, or an alias thereof, of a server that receives or handles messages, such as e-mail, for the user identified in the first portion. Host names typically have two or more parts, separated by dots. The part on the left is the most specific, and the part on the right is the most general. In some cases, for example, the host name portion of a message address may not be specified because it may be implicit. For instance, in some cases it may be assumed that messages addressed to any address without a host name may be delivered to or through a default mail handling server of an entity, such as a company or a service provider from which the message is sent, such that the host name or alias of that server need not be specified.

Group addresses can have a format similar to that of a user address; however, it is to be recognized that a group address represents a group of addresses which may be user addresses or further group addresses. For a group address, one portion is typically the group name that is set up with an address provider, for example a network administrator, and stored in the source directory for use by the server. Information about the group is mapped to the group name in the source directory, such as for example a list of members (by user name). The group name is frequently in the form of the name or nickname of the group associated with the group address. Again, the second portion identifies the host name, or an alias thereof, of a server that receives or handles e-mail for the group identified in the first portion.

Although, the aforementioned description of a particular format for message addresses is consistent with that used in many extant messaging systems, it is to be recognized, as mentioned previously, that the embodiments described herein can be extended to message addresses in other formats.

As an overview and before referring to the Figures for additional details, reference will be made herein to a system (and methods related thereto) as an example including facilities that allow a group address to be resolved by expanding the group address into user addresses by looking up user names for members of the group associated with the group address from a source directory then looking up an user address for each of the user names through a user cache of user names mapped to user addresses. The system also includes facilities to resolve the group address to a group name and to look up user names for members of the group based on the group name. The system further includes facilities to encrypt the message and transmit it to the user addresses. The system also includes facilities to transmit a request for transmission of the message to a group address and for encryption of the message prior to resolving the group address. The system also includes facilities to lookup encryption keys for encryption from a source directory using the user names from the cache.

The resolution of group addresses in this manner is acceptable for use with messages to be encrypted as the security risk of sending a message to an out of date user address for a correct user name or using an out of date digital certificate for a correct user name is low. The most likely result is that a message will either not be received or will be received and not be able to be decrypted. If the message is not received then the sender may receive an undeliverable message warning and know to resend the message. When the cache is updated, the message will be deliverable. If a message is received but not able to be decrypted then the recipient can ask to have the message resent. Again, when the cache is updated, the message will be able to be decrypted. By using the source directory to lookup user names associated with a group, messages are unlikely to be addressed to incorrect users.

Further details around the basic system and methods described above can include facilities and method steps for checking in a group cache to see if a group name has already been looked up for a message, for example because it appears already as a group name in the message addresses or nested within a previously resolved group name for the message. If so, the process can be stopped for the group name as it need not be repeated. Similarly, there may be provided facilities and method steps for checking in the user cache to see if a user name has already been looked up for a message, for example because it appears already as a user name in the message addresses or nested within a previously resolved group name for the message, or it was looked up by default as a user name even though it was a group name. If so, the process can be stopped for look up as a user name as it need not be repeated. To facilitate the above checks, an indication when a message address has been looked up as a user name for a message can be added to the user cache, and an indication when a message address has been looked up as a group name for a message can be added to the group cache. Such indications for group names are cleared when the address resolution has completed for a message. If the lookup of a user name in the cache fails then the user name can be looked up in the server for use with the message and the relevant information can also be added to the user cache for future lookups. The process for resolution of group names can be called recursively to resolve nested group names. A check can be performed to limit the number of nesting levels checked to defend against circular, self-referential, or very deep (and time-consuming) groups. Such groups could exist naturally, or be created as an exploit attempt.

Referring now to the drawings, in FIG. 1 a system 1 for sending messages from a message client 3 provides an example environment in which example embodiments of aspects of the application may be used. It will be appreciated that aspects of the application may be applied to other environments with or without modifications, which modifications would be within the ability of one of skill in the art.

The system 1 includes one or more message servers 5, one of which is shown in FIG. 1. It also include one or more source directories 7 for the message server 5, which hold message related data, including for example group records 9, user address records 11 and user encryption key records 13. It is to be understood that the source directories may contain other data, such as for example sent messages, draft messages, received messages, contacts and other data the description of which is being omitted for clarity.

Figure 2:
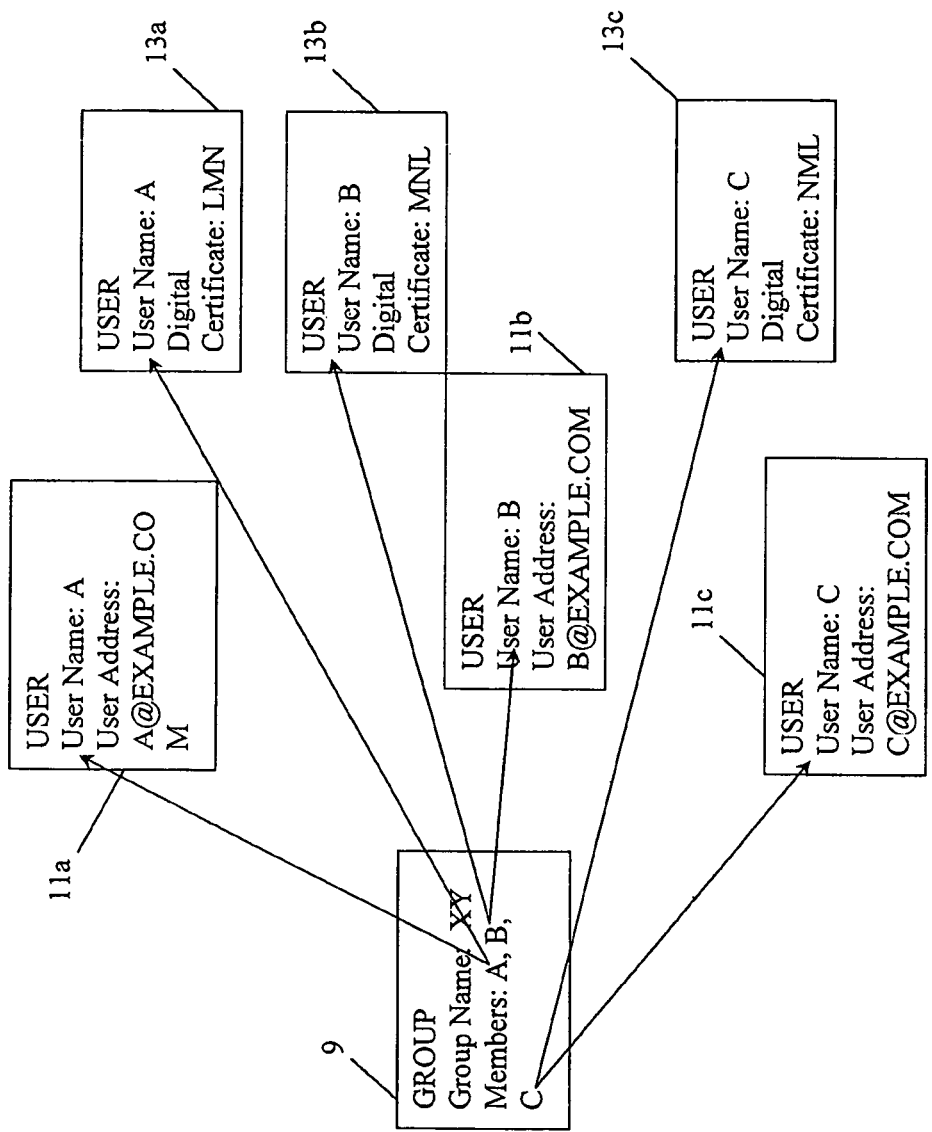
FIG. 2 shows a graphic illustration of example records that may be used in the system of FIG. 1.

Referring to FIG. 2, example group record 9, user address records 11a, 11b, 11c and user encryption key records 13a, 13b, 13c are shown in further detail. The group record 9 shows a group name XY with user names A, B, C. User address record 11a shows for example a user name A with a user address A@EXAMPLE.COM. User encryption key record 13a shows a user name A with a user encryption key LMN. The user address record 11a, 11b, 11c can be merged with the user encryption key records 13a, 13b, 13c, respectively, if desired. The user names in the member list of the group record 9 can be used as pointers to the user names in the respective user address records 11a, 11b, 11c and user encryption key records 13a, 13b, 13c, as indicated by the arrows in FIG. 2.

Referring again to FIG. 1, the system 1 further includes a message agent 15 that performs message related processing. In the example shown in FIG. 1, the message agent 15 is shown independent of the message server 5. It is to be understood that the message agent 15 and/or all or part of the messaging functions described in respect of the message agent 15 can form part of the message server 5 with consequent modification to the system 1. In the embodiment described later an example is described wherein the message server 5 and the message agent 15 are provided by different entities and adapted to the purposes described. Accordingly, the message agent 15 and message server 5 are described independently for that embodiment. It is noted that some embodiments of the methods and systems described herein may provide additional improvements over simply searching the source directory 7 through the server 5 to resolve message addresses where communication between the message agent 15 and the server 5 utilize (or, but for the techniques described herein, would utilize), an application programming interface (API) of the message server 5 which can involve significant time and resources.

A user cache 17 is provided for the message agent 15. The cache 17 stores and provides access to user data by user name, such as user address records 18 and, possibly, user encryption key records 19. The user data is accessible to the message agent 15 without having to access the data in the source directories 7, directly or through the message server 5. The cache 17 is stored in a location that is quickly accessible by the message agent 15 and reduces effect on system 1 performance when compared to accessing the same data in the source directories 7 through the message server 5. For example, user cache 17 may be realized in a random access memory of the message agent 15. It is to be recognized that the cache 17 could be in another location that is quickly accessible to the message agent 15 and reduces effect on system 1 performance, including but for example local disk storage or network-accessible storage facilities. As groups may have many users, the benefit of the cache 17 can be significant.

The cache 17 is nominally divided into two portions: a resolved user portion 20a containing user data, such as records 18, 19, for user names that have been found on the source directory 7, and an unresolved user name portion 20b containing a list of message addresses that have been looked up as user names in the source directory 7 but not found as user names ("unresolved user names"). The resolved user portion 20a and unresolved user portion 20b are shown for ease of illustration as divided by dividing line 20c; however, it is to be recognized that this is a notional dividing line only. The portions 20a, 20b may simply be entries in a single memory structure or the cache 17 can be divided among a plurality of memory structures as appropriate for a given installation or configuration. The cache 17 persists for resolution of message addresses for successive messages. Example factors that may be taken into account in managing the cache are discussed later in this description.

A group cache 20d is also provided for use by the message agent 15. The group cache 20d is a list that stores message addresses previously looked up as group addresses for a particular message. The group cache 20d provides an indication of whether or not a looked up message address is in the cache 20d. Entry in the group cache 20d represent whether or not a message address has already been looked up as a group address for the particular message. The group cache 20d is used by the message agent 15 to determine if a message address has already been looked up as a group address for the particular message. If a message address has earlier been looked up as a group address for the particular message, either the look-up will have been successful, in which case the members of the group will already have been resolved to recipient addresses and added to the list of message recipients, or the look-up will have been unsuccessful. In either case, it is not necessary to attempt to look up again the same message address as part of processing the message addresses for the particular message. Accordingly, presence of a message address in the group cache 20d inhibits subsequent look-ups by message agent 15 of the same address during the processing of recipient addresses for the particular message. The group cache 20d is cleared after resolution of the message addresses for each message. The group cache 20d is temporary in the sense that its content does not persist between messages. The group cache 20d is stored in a location that is quickly accessible by the message agent 15.

In some embodiments the group cache 20d can also store with the message address an indication of whether or not a lookup was performed for the message address on the server 5 to determine if the message address was a group address. This indication is stored in the cache 20d as it is possible that, where the nesting level of the message address is too deep, the message address may be stored in the cache 20d even though a lookup on the server 5 has not been performed. The indication of whether or not a lookup was performed on the server 5 can be used to determine whether or not a lookup should be performed or skipped if the message address is encountered again for the same message.

It is to be noted that group names can also serve as group addresses as mentioned previously. Accordingly, group names are also stored in the group cache 20d as group addresses where the longer form of group addresses, or an alias, was originally used as the group address to initiate the lookup. Server 5, as with most extant servers 5, is able to resolve a long form of group address, or alias, to a group name provided this association is stored in the source directory 7. Accordingly, the server 5 is used to resolve from long form group addresses, or other aliases, to group names. It is recognized that this function could be fully or partially performed elsewhere. For example, for message addresses in RFC-822 format, the message agent 15 could extract the local-part of the address (that is, the portion before an @ symbol), and the message agent 15 could initiate a lookup, using that portion as a group name.

A typical configuration for the system 1 includes a network 21, such as a local area network, for communication between the message agent 15, the message server 5 and the source directories 7. As shown in FIG. 1, the message agent 15 may be connected for communication to the message client 3 through a network 23. The network 23 may, for example, be a carrier-operated data network, such as a cellular network, PCS, or other wireless network or other network incorporating wireless handheld devices (see example embodiment described later below) on which the message client 3 is operating. In alternative embodiments the client 3 may be connected to the network 21 for communication with the message agent 15.

Each of the message agent 15 and message server 5 may be implemented using one or more appropriate software programs implemented on compatible hardware to perform the functions described herein. For example, each of message agent 15 and message server 5 may be realized using commercial server computers having Intel™ IA-32-based processors and running an operating system in the Microsoft Windows Server™ family, such as Windows Server 2003.

Figure 3:
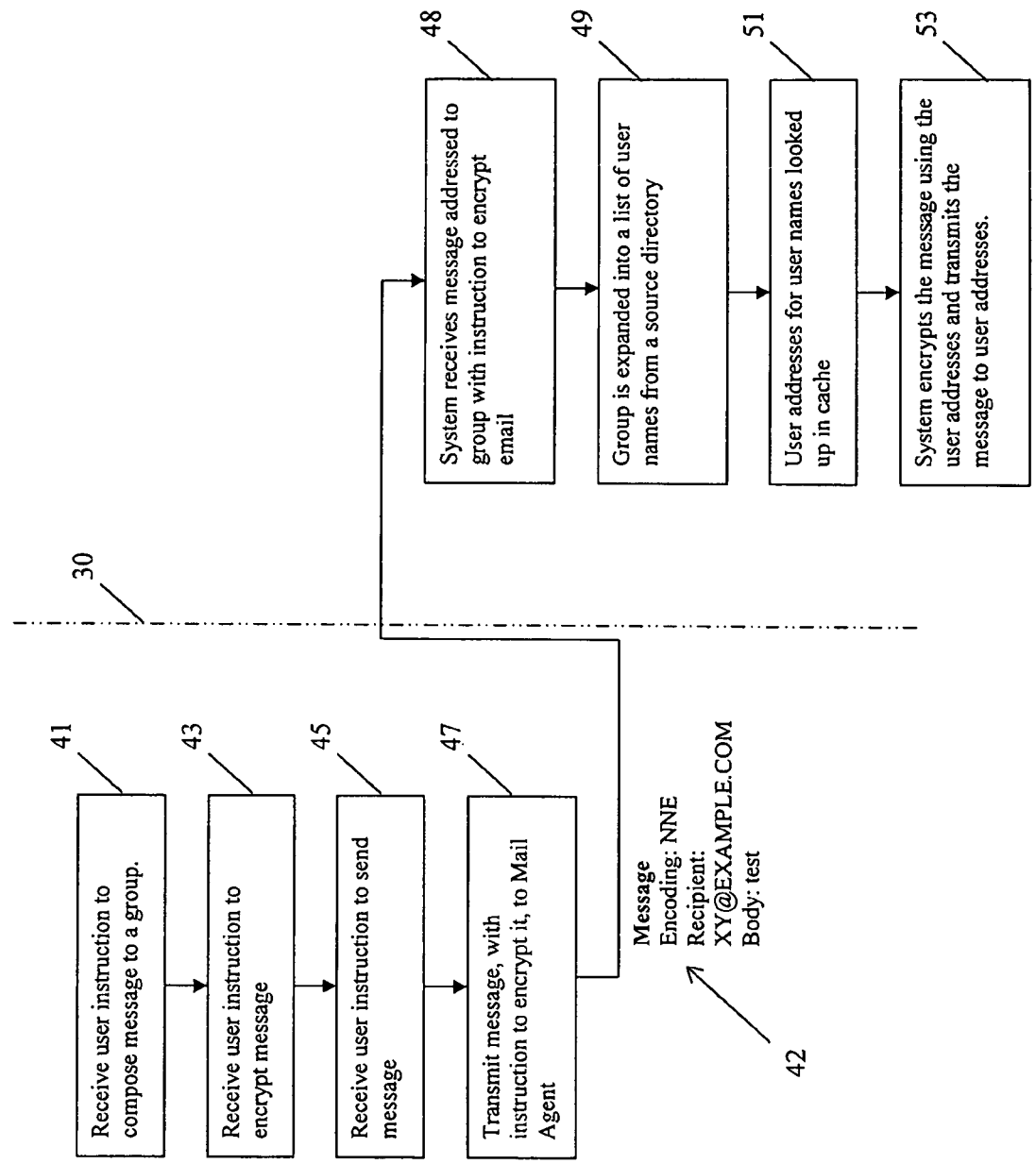
FIG. 3 shows, in diagrammatic form, an example flowchart of the respective operations of the client and the system of FIG. 1.

Referring to FIG. 3, a flowchart of example functions of the client 3 and the system 1 are shown. For clarity, a dividing line 30 in FIG. 3 is used to illustrate an example division of functions between the client 3 and the system 1, as will be further described below.

At 41 the client 3 receives user instruction to compose a message 42 to a group. At 43 the client 3 receives user instruction to encrypt the message 42. At 45 the client 3 receives user instruction to send the message 42. At 47 the client 3 transmits the message 42 to the message agent 15 including an instruction to encrypt the message 42. In the example embodiments described herein, encryption of message 42 is performed on the message server 5 for, on behalf of, or as a service to, the message agent 15. Many commercially-available message servers 5 include encryption capabilities and it is most efficient to use such capabilities. It would be possible to perform encryption elsewhere, for example at the message agent 15 by providing such capabilities at the message agent 15. Message 42 depicts elements of an example message format, including parameters defining the encoding, recipient and body of the message 42. The encoding mentioned by way of example in FIG. 3 is NNE, Notes Native Encryption. Other forms of encryption, including for example conventional public key encryption, conventional private key encryption, and commercially-available encryption technologies such as those available from RSA Data Security, could also be used. Other formats for the message and instructions to encrypt the message could also be used.

At 48, the system 1 receives the message and instructions to encrypt the message from the client 3. At 49, the system 1 expands the group name into a list of user names of the group from the source directory 7. At 51, the system 1 looks up a user address for each of the user names through the user data cache 17 containing mappings of user names to user addresses. At 53, the system 1 encrypts the message and transmits it to the associated user address.

Figure 4:
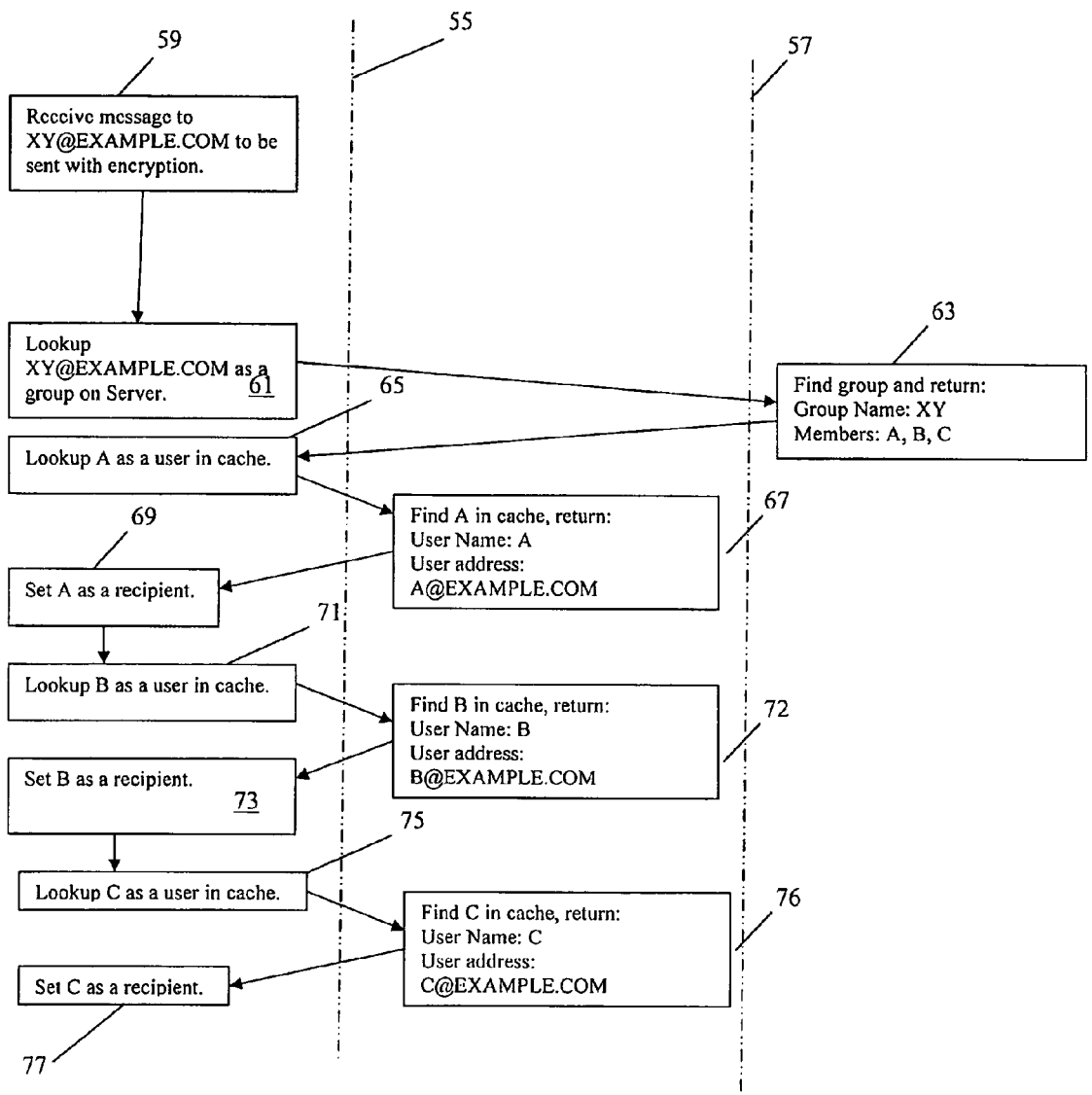
FIG. 4 shows, in diagrammatic form, an illustrative example of user name resolution utilizing the system of FIG. 1 operating in accordance with the flowchart of FIG. 3, where all user names are found in a cache.

Referring to FIG. 4, an operational example illustrates example functions within the system 1 when operating in accordance with an example embodiment of the flowchart of FIG. 3, where all user names are in the cache 17. For clarity, dividing lines 55, 57 are used to divide the functions of the message agent 15, cache 17 and message server 5 from left to right. As mentioned previously, the particular division of the functions amongst the message agent 15 and the server 5 described herein is an example only. Other allocations of these functions could also be used without departing from the spirit of the present disclosure.

At 59, message agent 15 receives message 42 (FIG. 3) to be sent with encryption. Continuing with the example message 42 used earlier in connection with FIG. 3, message 42 is addressed to group address XY@EXAMPLE.COM. At 61, the message agent 15 looks up the group name using the group address (XY@EXAMPLE.COM) of the message 42 through the server 5 from the source directory 7. At 63, the server 5 returns user names A, B, C of the members of group name XY. Where, as in this example, the group address is provided in a two part format then the server 5 can resolve the group address to a group name. For example, the server 5 may check that the server 5 is the appropriate server for the host named in the host name portion of the group address, and may then extract the group name as that portion of the address before the @ symbol. At 65, the message agent 15 looks up user name A in the cache 17. At 67, the cache 17 returns message address A@EXAMPLE.COM for user name A. At 69 user name A is set as a recipient of the message by the message agent 15. Steps 65, 67 and 69 are repeated for B at 71, 72, 73, and C at 75, 76, 77. The above description assumes that it is known that XY@EXAMPLE.COM is a group name and that the user names and associated user addresses for A, B and C have been previously populated in the cache 17.

Figure 5:
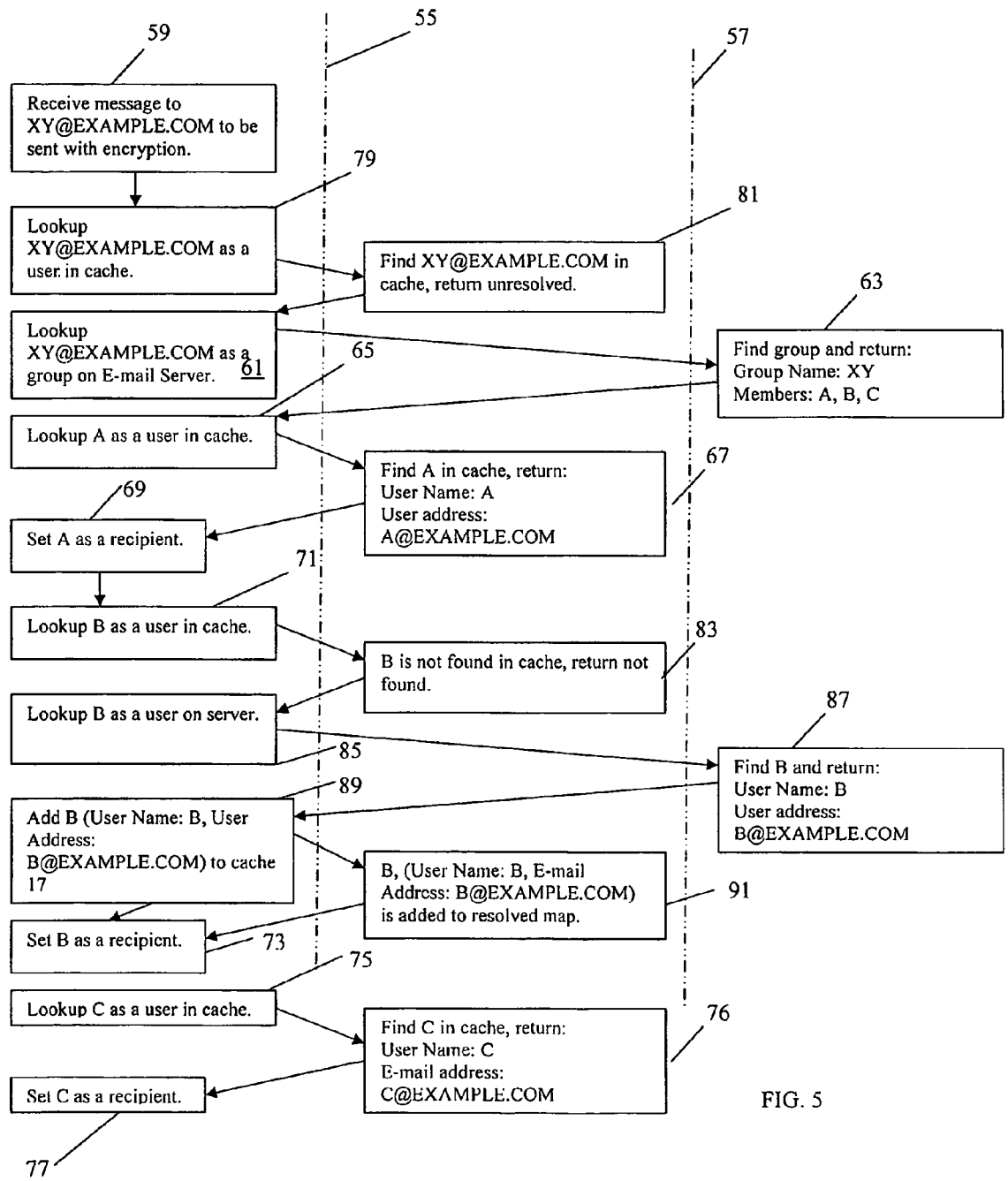
FIG. 5 shows, in diagrammatic form, a further illustrative example of user name resolution base utilizing the system of FIG. 1 operating in accordance with the flowchart of FIG. 3, where a user name is not found in a cache.

Referring to FIG. 5, an operational example illustrates example functions within the system 1 when operating in accordance with an example embodiment of the flowchart of FIG. 3, where the message address is not initially known to be a group address, and the message address is initially missing from the user cache 17. Those steps that are the same from FIG. 4 are referenced with the same reference numerals, and the description is not repeated. At 79, the message agent 15 first looks up the message address as a user address in the cache 17. Although the address is actually a group address, it is not initially recognized as such by message agent 15. At 81, the cache 17 returns the message address as unresolved because it is stored as an entry for the user address in the cache 17. In 61 through 71, the message agent 15 then continues to look up the group address as in FIG. 4. At 83, the cache 17 returns a failure to find B as an entry in the cache 17 under the user name B. At 85, the message agent 15 looks up B as a user name through the message server 5. At 87 the message server 5 finds the user name B in the directory 7 and returns B@EXAMPLE.COM as the user address. At 89, the message agent 15 instructs the cache 17 to add an entry in the cache 17 with B as a user name and B@EXAMPLE.COM as the associated user address. At 91, the cache 17 adds B, and associated User Name: B, User Address: B@EXAMPLE.COM to the cache 17. At 73 through 77, user C is looked up in the cache, and the corresponding address is set as an address to which the message will be sent, as in FIG. 4.

The above illustrates how the cache 17 can be populated. In the embodiment described above, initially the cache 17 would have been empty and then populated through repeated calls to the server 5. It has been found that removing individual data entries (user names, user addresses) that have been in the cache 17 for four hours is acceptable in the environment described further below. For example, if User Name A is added to the cache 17 at 2 pm and User Name B is added at 3 pm then User Name A would be removed at 6 pm and User Name B would be removed at 7 pm. If desired the cache 17 could be refreshed in its entirety so as not to require server 5 look ups; however, this may cause unnecessary network traffic and longer cache 17 look up times. As another alternative, the cache 17 could refresh frequently used user addresses. Other cache management or refresh strategies and other cache tenancy times may also be used, depending in part on such factors as, by way of example, how much storage is available for the cache 17, the rate of messaging transactions, and the rate of changes to the source directory (thereby invalidating the contents of the cache 17).

To maximize clarity in the initial description of the operation of an example system 1, the most straightforward example instances of operation are described. In particular, messages with multiple message addresses or nested message addresses may be encountered, for which additional processing steps may be desirable. Example techniques for handling such messages will be discussed later in this description.

Figure 6:
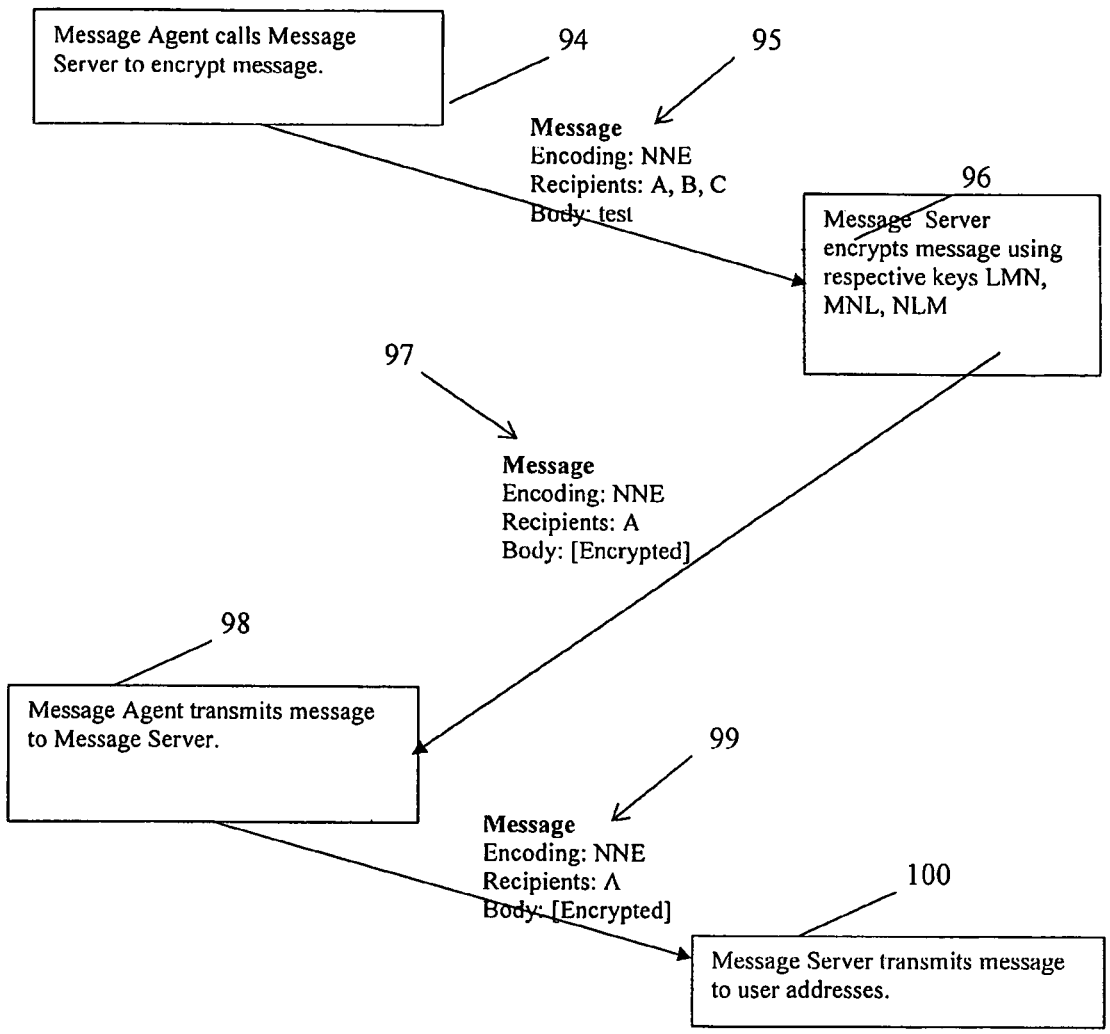
FIG. 6 shows, in diagrammatic form, an illustrative example of respective operations performed by a message agent and a message server in encrypting messages utilizing the system of FIG. 1 operating in accordance with an example embodiment of the flowchart of FIG. 3.

Referring to FIG. 6, an illustrative example of respective operations performed by message agent 15 and message server 5 in encrypting messages in accordance with an example embodiment of the flowchart of FIG. 3 is shown. At 94, the message agent 15 requests the message server 5 to encrypt a message 95. The format of the message 95 contains the user names A, B, C as recipients and the body "test". The format of the message 95 is similar to the format of the messages 42 in previous FIGS; although, it is noted that the specific example message addresses have been altered in FIG. 6 to illustrate the concepts of the example embodiment now being discussed. User names found earlier are re-used in the request to the server 5 to further benefit from the functions described herein; however, the message agent 15 could resolve the user name again through the server 5 or the cache 17 if desired. At 96, the server 5 then looks up the respective encryption key LMN, MNL, NLM to be used for each recipient A, B, C and returns separate encrypted messages 97 for each recipient (one such message 97 for recipient A being shown in FIG. 6). At 98, the message agent 15 receives the encrypted messages 97 and requests the server 5 to transmit messages 99 (again, one such message 99 for recipient A being shown in FIG. 6). At 100, the server 5 transmits the messages to the recipients A, B, C. Alternatively, if supported by the server 5, the server 5 can at 96 encrypt and return one message 97 for all recipients A, B, C and, at 98, the message agent 15 can receive the encrypted message 97 and request the server 5 to transmit message 99. At 100, the server 5 then transmits the message to the recipients A, B, C.

Referring to FIGS. 7-10 various example user interface displays 101, 103, 105, 107 may be displayed on a message client 3 to a user while the client carries out steps 41, 43, 45 of FIG. 3. The user interface displays 101, 103, 105, 107 depicted in FIGS. 7-10 are of a size and aspect ratio that may be used, for example, on a handheld wireless client 3. The client 3 has input devices such as a point and click device and a keyboard (not shown) for entry of text and navigation through menu items. The client 3 may take other forms, such as a personal computer connected to the Internet through a wired or wireless connection (not shown). Other input devices such as for example a mouse, trackball or tablet (not shown) could also be used. Alternate displays, not shown, may be used as appropriate or desired for the message client 3, for example, to carry out the functions and provide features described herein.

Figure 7:
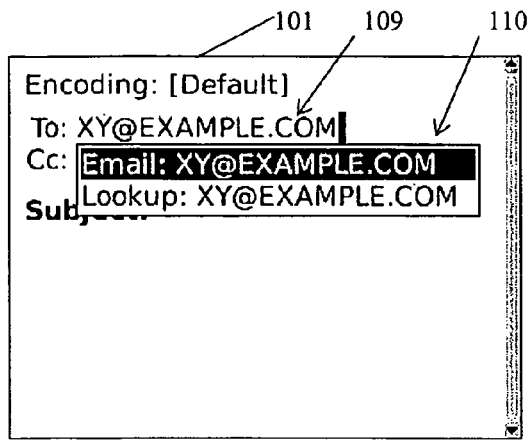
FIGS. 7-10 show example layouts of user interface displays which may be presented in conjunction with a messaging client such as that shown in FIG. 1 to a user.

Referring to FIG. 7, a user addresses a message by entering a group address (XY@EXAMPLE.COM) as a message address into a TO: field 109 of display 101. As shown, after the user enters at least a part of a group name recognized by the client 3, the group name may appear in a drop down box 110 for selection to enter into the field 109.

Figure 8:
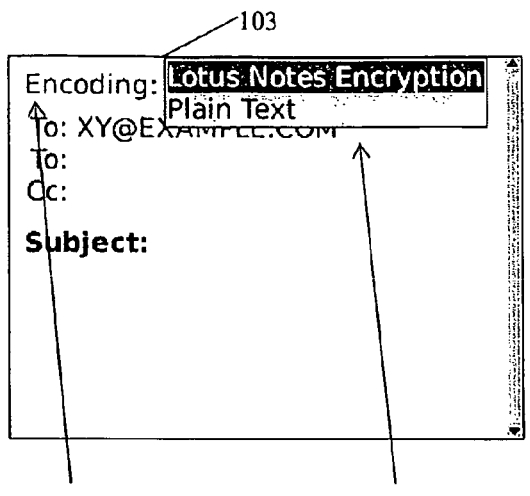

Referring to FIG. 8, a user may enter into display 103 a particular encoding type selection for entry into an encoding field 111. Similarly to FIG. 7, the encoding may be selected from a drop down box 112 for entry into the field 111. The type of encoding may include encryption, such as for example LOTUS NOTES™ Encryption or other types of encryption mentioned previously.

Figure 9:
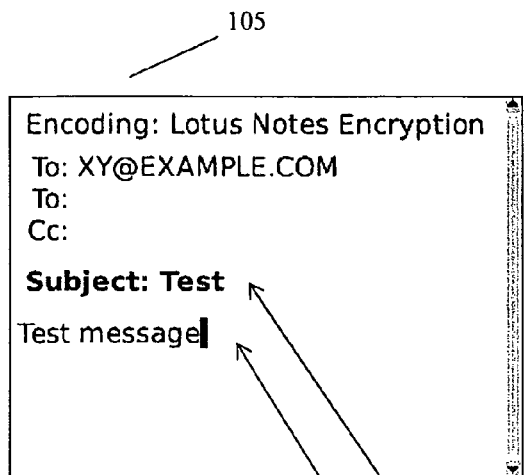

Referring to FIG. 9, a user may enter into display 105 a subject of a message into a Subject: field 113 and a body of a message into a body field 114.

Figure 10:
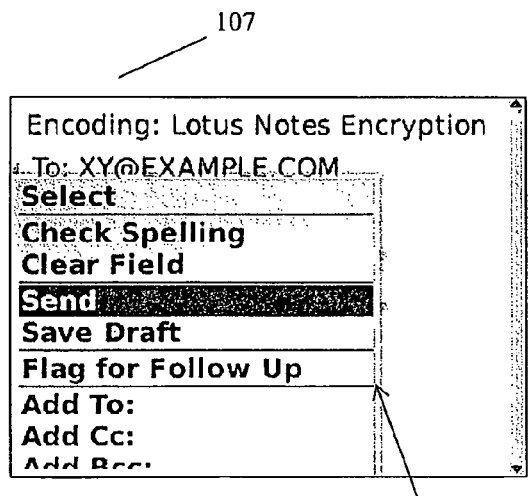

Referring to FIG. 10, a user may instruct the client 3 to send the message through a drop down box 115 overlaid on display 107.

A further example embodiment of steps of a method is illustrated later below in pseudo code that could be implemented, for example, by incorporating one or more computer programs for operation on the system 1 in the message agent 15 to interact with the caches 17, 20*d* and the server 5 to resolve group addresses to members, user names and user addresses in accordance, for example, with the flowchart of FIG. 3. The embodiment sets out two primary function calls based generally on the steps set out in the flowchart in FIG. 3 and the more detailed examples in FIGS. 4 and 5 that, for groups, first resolve group addresses to members (Resolve-GroupMembers) and then resolve the members to user names (ResolveUser).

Additional functionality is provided for message addresses involving additional complexity, such as messages with nested message addresses. For the purposes of this application a message address within a nested level is considered to be a message address as it is equally unresolved at the time processing begins. The nested message address is processed in the same manner as a message address actually entered by a user of the client 3, such as in field 109 of FIG. 7. The steps of the embodiment are divided into three portions listed below under the headings Resolving Message Recipients, Resolving Group Members, and Resolving Users.

The Resolving Message Recipients portion calls the other two portions as required to resolve message addresses. The Resolving Message Recipients portion defaults to resolving each message address as a user name by calling ResolveUser first for the message address. Then, if ResolveUser fails, ResolveGroupMembers is called. If a message address is resolved as a user address then a user name is returned for the address, such that the user name can be stored in the cache 17. It is possible that a user name could later appear as part of a message address containing nested levels or in another message address of the same message or another message, and the user name need not be looked up again from the source directory 17 while the user name is available in the user cache 17.

If a message address is resolved as a group address then the group address is resolved to a group name and group members (user names). The group name is stored in the cache 20*d*. Any distinct group address used to lookup the group name is also stored. The group cache 20*d* is accessed initially for each message address of a message so that message address resolution is fully attempted only once for any particular message address in the same message, which message includes, for example, a message address with nested levels or multiple message addresses at one level Further the embodiment can be used to resolve messages including multiple message addresses at a single level by repeatedly calling the ResolveGroupMembers function to step through each message address.

Figure 11:
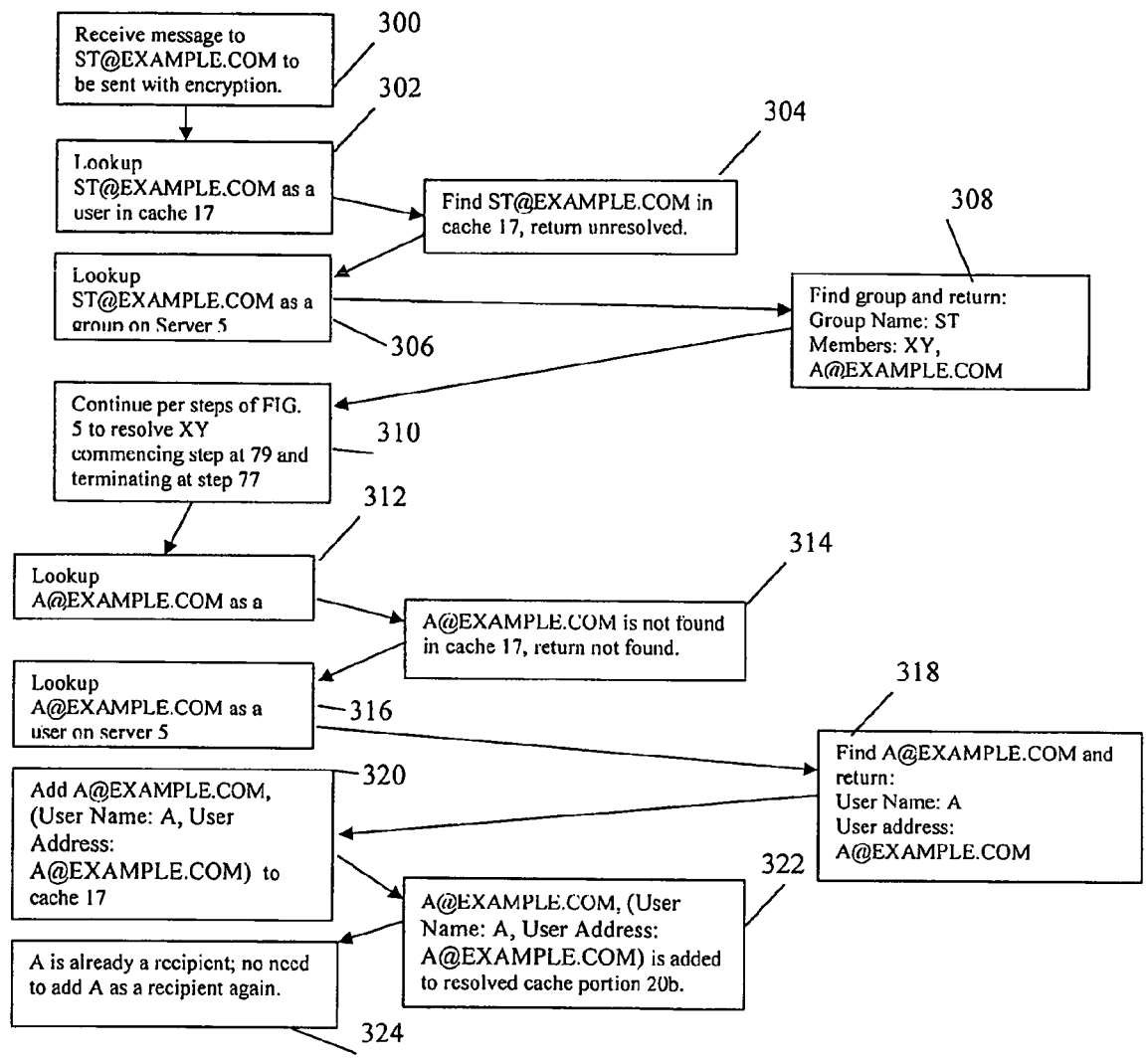
FIG. 11 shows, in diagrammatic form, an illustrative example of message address resolution utilizing the system of FIG. 1 operating in accordance with the flowchart of FIG. 3, including nested message addresses and mixed message addresses.

An example of the operation of the system 1 in accordance with the pseudo code on a message address with a nested group (Group ST, having member Group XY) and multiple message addresses at a single level (having member Group XY and User A) is illustrated in FIG. 11. A message is received at the message agent 15 with a message address of ST@EXAMPLE.COM at 300 and the portion Resolving Message Recipients first looks up ST@EXAMPLE.COM as a user in the user cache 17 using ResolveUser at 302. In this example, group ST was previously looked up as a user name and not found, so entered as unresolved in the cache 17. The cache 17 does a find on ST@EXAMPLE.COM which is found as unresolved (i.e. in the unresolved cache 20*b*) because it happens to be a group address that was previously searched. The cache 17 therefore returns the address as unresolved at 304. If ST was not found in the cache then ST would be looked up on the mail server 5 as a user name, returning a not found indication, ST would then be added to the cache 17 as an unresolved user, and ST would then be looked up as a group on the mail server 5. Continuing as part of Resolving Message Recipients the embodiment then attempts to resolve the message address ST@EXAMPLE.COM as a group address using ResolveGroupMembers at step 306. The server 5 returns the group name ST and members XY, A@EXAMPLE.COM at step 308.

The embodiment then continues resolving XY, first as a user address and then as a group address at step 310 per the steps of FIG. 5 described above commencing at step 79 and terminating at step 77 of FIG. 5. The embodiment then continues resolving A@EXAMPLE.COM as a user address by first looking up A@EXAMPLE.COM as a user address in cache 17 at step 312. The cache 17 does not find A@EXAMPLE.COM in the cache 17 and returns A@EXAMPLE.COM as not found at step 314. Although A was looked up previously in step 67 and following of FIG. 5, A @EXAMPLE.COM was not. A@EXAMPLE.COM is then looked up as a user name on the server 5 at step 316. The server 5 finds A as a user name for email address A@EXAMPLE.COM and returns A as a user name with associated email address A@EXAMPLE.COM at step 318. The message agent 15 instructs the cache 17 to add A@EXAMPLE.COM with the information User Name A and User Address: A@EXAMPLE.COM to cache 17 at step 320. A@EXAMPLE.COM and associated User name: A and User Address: A@EXAMPLE.COM are added to the resolved portion of cache 17 at step 322. A's information is now in the cache 17 twice and can be found by looking up message address A or A@EXAMPLE.COM. The embodiment then recognizes A as an existing recipient and, at step 310A, A is not again added as a recipient, effectively filtering out the duplicate message address. A can be recognized by the message agent 15 as an existing recipient because user names are required to be unique on the server 5, and, as a result, User Name A returned by the server 5 must be the same as User Name A that was found in the cache 17 earlier on when resolving the members of XY.

The embodiment defines, example inputs and output, and queries utilized in the function calls. It is to be recognized that the embodiment is an example only. An actual implementation can take many different forms.

In the embodiment, nested groups are permitted up to a certain limit and it is recognized that some groups may be repetitive within the nested levels or a particular message. Accordingly, temporary cache 20d is set up for resolution of groups on a message such that a group name is not attempted to be resolved more than once for each message. The temporary cache 20d is cleared after the groups for a message have been resolved. The functions are recursively called until all the groups of the message have been resolved to user names and to user addresses (to the extent available).

```
Pseudo Code Begins
Resolving Message Recipients
Input:
  messageAddresses - message addresses for the recipients of the
message as specified by the mail client, e.g. group or user SMTP
addresses
  Output:
  resolvedList - list of user names of resolved message addresses
  unresolvedList - list of unresolved message addresses
  Notes:
  groupCache - as described elsewhere in the pseudocode; this cache
exists within the scope of ResolveMessageAddresses function
  ResolveUser - the function as described elsewhere in the pseudocode
  ResolveGroupMembers - the function described elsewhere in the
pseudocode
  FUNCTION ResolveMessageRecipients(messageAddresses,
resolvedList, unresolvedList)
    for each address in messageAddresses
      if ResolveUser(address, userName) is successful then
        add userName to resolvedList
      else if ResolveGroupMembers(address, resolvedList,
unresolvedList, groupCache, 0) returns false then
        add address to unresolvedList
        remove address from messageAddresses
      end if
    end for
  end ResolveMessageRecipients
Resolving Group Members
Input:
  MessageAddress - Message address to do lookup on to try to resolve
to a group name and members, e.g. group SMTP address or group name
  level - level of recursion (group nesting)
  groupCache - a cache 20d containing a map of message addresses
(including associated group name, if any) and whether or not a lookup was
performed for the message on the message address (and associated group
name, if any)
  Output:
  resolvedList - list of names of resolved for the message group
members (only contains names of users)
  unresolvedList - list of group's members that couldn't be resolved for
the message (can contain names of users or groups)
  groupCache - (as described earlier in the pseudocode)
  Return:
  false if lookup on messageAddress fails or if level of recursion is too
high, true otherwise
  Notes:
  LookupGroup is a query to the message server 5 looking in source
directory 17; if successful, it returns the group's name (groupName) and
a list of the group's members (memberList)
  ResolveUser is a query to the cache 17, and possibly to the message
server 5 for looking in source directory 17 (pseudocode algorithm below);
if successful, it returns the user's user name (userName)
  FUNCTION ResolveGroupMembers(MessageAddress, resolvedList,
unresolvedList, groupCache, level)
    // check if we've seen messageAddress before
    if messageAddress is in groupCache then
      if lookup was performed on messageAddress then
        return true
      end if
      remove messageAddress from unresolvedList
    end if
    // check if recursion level is too high
    if level > levelLIMIT then - Note: levelLimit is a configurable
setting to limit recursion as discussed previously, 4 is used in the as an
example for levelLIMIT. No limit has been provided to the number of
direct members of a group. As an example, with a levelLIMIT of 4, if
Group1 is being resolved, and Group1 has a member Group2 that has a
member Group3 that has a member Group4 that has a member Group5 that
has a member Group6, Group2-Group5 are resolved, but Group6 is not.
However, if Group1 has members Group2-Group6 (no nesting) then
Group6 is resolved.
      add messageAddress to groupCache and set that no lookup was
performed on it
      return false
    end if
    // perform lookup on MessageAddress
    add messageAddress to groupCache and set that a lookup has
been performed
    if LookupGroup(MessageAddress) is not successful then
      return false
    end if
    // check if we've seen groupName before
    if groupName is different from messageAddress then
      if groupName is in groupCache then
        if lookup was performed on groupName then
          return true
        end if
        remove messageAddress from unresolvedList
      end if
    end if
    increment level - Note: the new value of level will be passed to
subsequent calls to ResolveGroupMembers during the loop to resolve the
groups direct members.
    add groupName to groupCache and set that a lookup has been
performed
    // resolve the group's members
    for each member of memberList
      if ResolveUser(member, userName) is successful then
        add userName to resolvedList
      else if ResolveGroupMembers(member, resolvedList,
```

-continued

```
unresolvedList, groupCache, level) returns false then
        add member to unresolvedList
    end if
  end for
  return true
end ResolveGroupMembers
  Note: Thus at the end of ResolveGroupMembers in the example used
for FIGS. 4 and 5, groupCache would contain XY@EXAMPLE.COM and
XY,resolvedList would contain A, B, C and unresolvedLIST would be
empty. Once the message has been processed (for example, encrypted and
transmitted to recipients) these lists in the temporary caches are cleared.
  Resolving Users:
  Input:
    MessageAddress - message address to do lookup on to try to resolve
to user name, e.g. user's SMTP address or a "nice" looking name
e.g. "John Doe". Function may be called after group is resolved to a
list of members, such members are considered to be message addresses for
the purposes of this description as members replace the original group
address.
  Output:
    userName - The name required by the message server in order to
encrypt the message for this recipient
  Return:
    True if the user was resolved, false otherwise
  Notes:
    resolved user cache is a map of lookup messageAddress to
information about the associated user (e.g. user name, SMTP address, etc)
obtained from looking up the messageAddress on the message server
    LookupInResolvedUserCache is a query to the resolved user cache
described above; if the messageAddress is found in the cache, it returns
true as well as the information about the user associated with the key
    unresolved user cache is a list of lookup keys that failed to be
resolved to users by the message server
    LookupInUnresolvedUserCache is a query to the unresolved user
cache described above; if the messageAddress is found in the cache, it
returns true
    LookupUser is a query to the message server to try to obtain
information about the user associated with the key
    FUNCTION ResolveUser(MessageAddress, userName)
      if LookupInResolvedUserCache(MessageAddress) is successful
then
        set userName to the resolved user's user name
        return true
      else if LookupInUnresolvedUserCache(MessageAddress) is
successful then
        return false
      end if
      if LookupUser(MessageAddress) is successful then
        set userName to the return user info
        add messageAddress and userName to the resolved user cache
        return true
      end if
      add messageAddress to the unresolved user cache
      return false
    end ResolveUser
    Pseudo Code Ends
```

A further possible example embodiment of the system 1 will be further described with reference to system 116 below. The functions described above can be implemented into the corresponding components of the system 116 (some of which have been referenced with corresponding reference numerals above) and the description provided above will not be repeated for the corresponding components.

Figure 12:
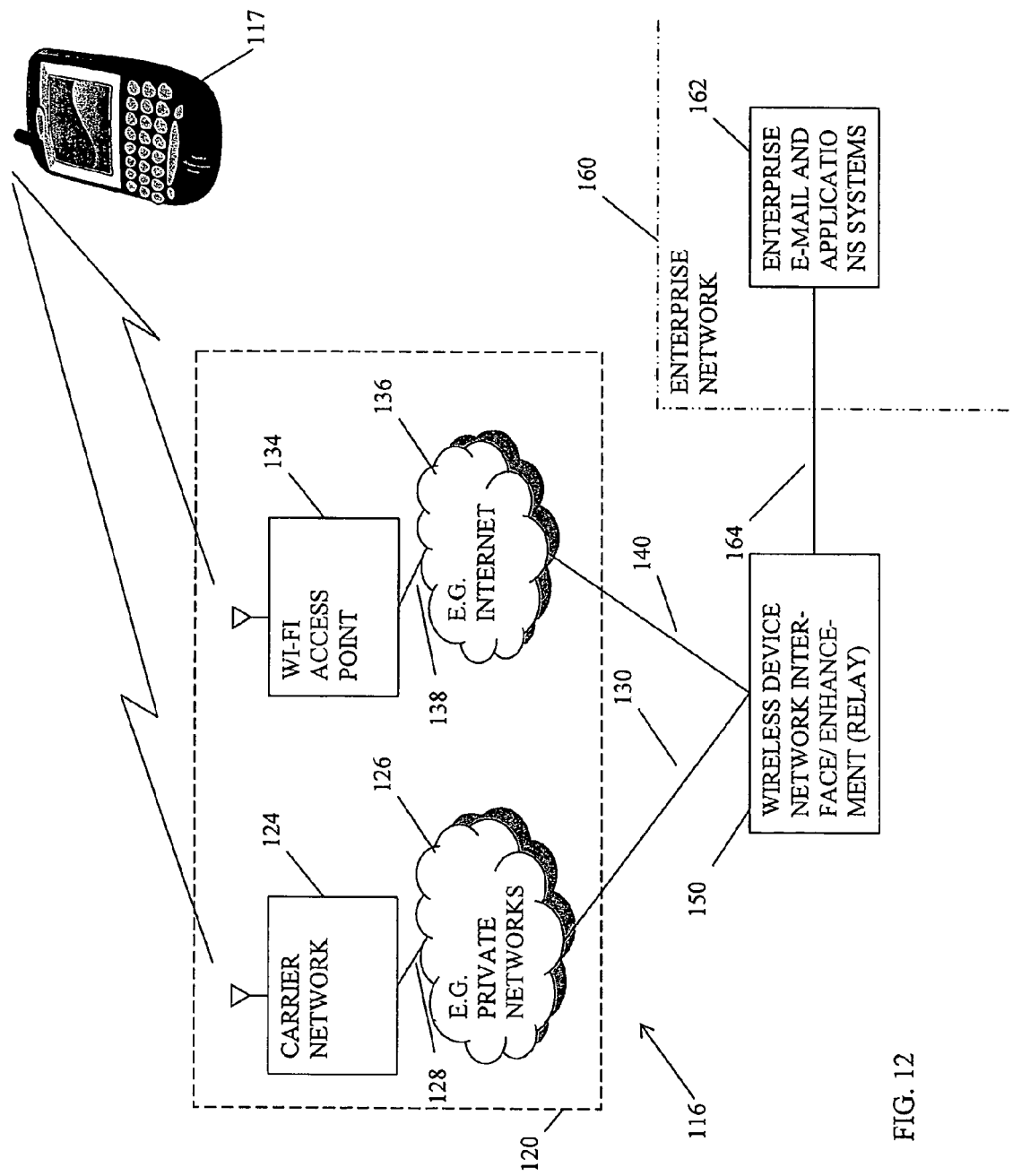
FIG. 12 shows a further example message client and a system to which an example embodiment of an aspect of the present invention can be applied.

A system 116 constructed according to aspects of the present invention for providing attachments to e-mail messages transmitted from or composed on a wireless hand-held device (WHHD) is shown generally in high-level schematic form in FIG. 12. FIG. 12 shows an example environment in which embodiments of the invention may be used. It will be appreciated that aspects of the invention may be applied to other environments with or without modifications, which modifications would be within the ken of one of skill in the art.

According to a further aspect of the present application, system 116 includes facilities in an enterprise network that cooperate with the WHHD to provide group name resolution and encryption for messages. A mail agent also cooperates with the WHHD, responsive to receive instructions from the WHHD to send an encrypted e-mail message to a group email address, including resolution of the group name to user names and encryption of the message for transmission to an email server.

As best seen in FIG. 12, a wireless telecommunications system 116 providing e-mail service to wireless hand-held devices and constructed according to an example embodiment for resolving group email addresses of encrypted email messages transmitted from or composed on a wireless hand-held device may comprise wireless hand-held device (WHHD) 117, an enterprise network 160, and one or more networks 120 coupling the WHHD to enterprise network 160. Although only a single WHHD 117 is shown for simplicity, commercial embodiments contemplate the use of a very large number of WHHDs 117.

Optionally, a wireless device network interface/enhancement facility (relay) 150 may be interposed between networks 120 and enterprise network 160. Relay 150 may provide a number of functions that facilitate and enhance the interface of the enterprise network 160 and WHHD 117, including without limitation, tracking the availability of WHHD 117 for communications, tracking which of several possible networks with which WHHD 117 may be in communication, managing flow of communications between WHHD 117 and enterprise network 160, and ensuring reliable communications between WHHD 117 and enterprise network 160. Relay 150 may be implemented and may function as described in Lewis U.S. Pat. No. 7,010,303, which is incorporated by reference herein. Although an embodiment constructed according to aspects of the present invention might operate successfully without relay 150, and it is therefore optional, further description of wireless system 116 will treat relay 150 as present; one of skill in the art will appreciate that connections to relay 150 could also be made directly to enterprise network 160, and some functions of relay 150 might be performed by elements of enterprise network 160.

WHHD-to-enterprise networks 120 may comprise one or more wireless networks and any additional transport networks needed to couple such wireless networks to relay 150. By way of example but not limitation, networks 120 may include a first network 124 which may be a telecommunications-carrier-operated public network, such as a GPRS, UMTS, CDMA, or other similar network of any generation or technology, offering data services to public subscribers or users. Networks 120 may also include, for example, a wireless network access point 134 for providing access via, for example, the group of wireless technologies known as WiFi. Other wireless access technologies could also be used. WHHD 117 preferably includes equipment compatible with at least one of the networks 124, 134 such that one or more wireless data communications links, such as 122, 132 may be established between the WHHD 117 and corresponding ones of networks 124, 134.

As is known in the art, networks 124 and 134 may be connected to relay 150 via one or more transport networks 126, 136. Transport networks 126, 136 may be realized using any suitable network technology, including without limitation leased data lines, virtual private networks, the Internet, and the like. For example, carrier networks 124 may typically (but not necessarily) be connected to relay 150 via leased lines or other private, dedicated, or non-shared facilities. For another example, WiFi access point 134 may typically (but not necessarily) be connected to relay 150 via the public Internet. The transport networks 126, 136 may be connected to relay 150 via any suitable links 130, 140. Relay 150 may be connected to enterprise network 160 via any suitable link 164.

Enterprise network 160 may, for example, be the internal network of a business or other enterprise, and may provide a variety of network and information services to internal users. Enterprise network 160 typically includes systems 162 for furnishing to users enterprise e-mail, personal computing, information storage, and other applications. Enterprise network 160 could also be the network of an Internet Service Provider (ISP) or an Application Service Provider (ASP), which may similarly provide network and information services to external subscribers. Where the term "enterprise" is used herein, unless otherwise specified, it is intended to refer to the e-mail and other applications and services, and the networks, servers, software, facilities and other infrastructure arranged to provide such applications and services, similar to those typically provided to corporate users, whether such applications and services are provided by an organization for internal use, or by a service provider for external use.

Figure 13:
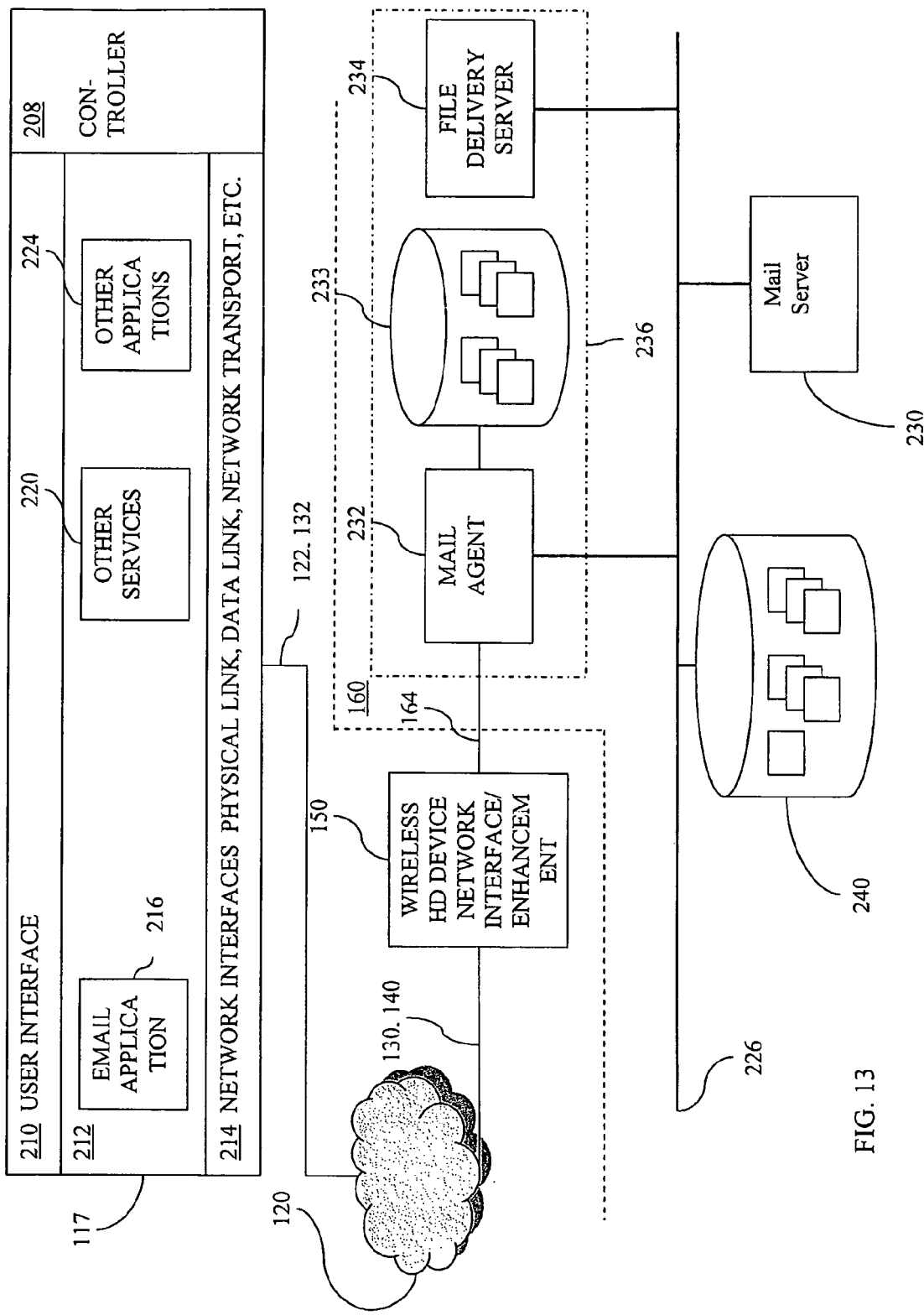
FIG. 13 shows in greater detail one example embodiment of the client and system of FIG. 12.

FIG. 13 depicts a more detailed block diagram of elements of the system 116 of FIG. 12, constructed according to aspects of the present invention. The general design of wireless handheld devices is known. Accordingly, discussion of WHHD 117 will generally be limited to those elements particularly relevant to an understanding of the invention and its embodiments. As best seen in FIG. 13, WHHD 117 may comprise a controller 208, a user interface system 210, an applications and services suite 212, and a network interface system 214. As is known in the art, controller 208 may be realized as a microprocessor based controller containing a CPU, read-write memory (e.g., RAM), a generally read-only memory (which may be electronically programmable from time to time, as in EEPROM, FLASH, and similar technologies), optional ancillary components, and may comprise or be coupled to various input/output devices, including components of user interface 210 and network interface 214. Controller 208 also includes appropriate software or firmware, which may include operating system software, for implementing its control functions, and for operating cooperatively with user interface 210 and network interface 214.

User interface 210 includes appropriate hardware and software for implementing a suitable user interface to enable a user to operate the applications and services provided by the device (in conjunction, where applicable) with external networks and information services. For example, user interface 210 may include a display and keyboard (see FIG. 12), and other input and output devices such as a trackball or other pointing device, a speaker, and the like. Other user interface hardware may also be provided. User interface 210 may also incorporate software or firmware for driving the user interface hardware, and for providing services to applications and services on the device. The software or firmware may be implemented as libraries, routines, procedures, objects, message-based interfaces, or other software constructs for performing user interface tasks, as is known in the art. The software or firmware may execute on controller 208.

WHHD applications and services suite 212 may provide a variety of applications and services to the user, in cooperation with user interface 210. In particular, applications/services 212 include at least an e-mail application 216, and may also include such items as services 220 and applications 224 that are not otherwise relevant to the aspects described herein. E-mail application 216 cooperates with components of the enterprise network 160 to provide e-mail services. Applications/services 212 may take the form of software or firmware and may execute on controller 208.

Network interface system 214 provides an interface between applications/services 212 and one or more wireless networks 120, such as carrier network 124 and WiFi access point 134 (FIG. 12). Network interface 214 incorporates hardware and firmware or software for implementing at least the physical link layers and data link layers required for accessing wireless networks 120. Network interface 214 may further optionally implement additional layers required for accessing wireless networks 120, including but not limited to the network layer and the transport layer. Alternatively, such layers may be implemented in elements of applications/services 212. The software or firmware may be implemented as libraries, routines, procedures, objects, message-based interfaces, or other software constructs for performing user interface tasks, as is known in the art. The software or firmware may execute on controller 208.

As best seen in FIG. 13, enterprise network 160 may include, by way of example but not limitation, a collection of enterprise e-mail and applications systems 162, some of which may be arranged to provide service to WHHDs such as WHHD 117. Enterprise systems 162 may include an enterprise e-mail application server 230 and an enterprise handheld services enhancement server 236, which may include as components a mail agent 232 and a file delivery server 234. The mail agent 232 is connected to a cache 233. The file delivery server 234 is shown only as an example of other components that may be included within the enterprise network 160 and is not specifically utilized in the methods described herein or required for the apparatuses. These elements may be interconnected using any suitable interconnect facility, such as network 226. Enterprise systems 162 may further comprise one or more storage facilities, such as disk drives or storage systems, such as system file storage unit 240, also interconnected via network 226.

Mail server 230 may be implemented as any suitable e-mail server capable of transmitting e-mail. For example, mail server 230 may be implemented as a Microsoft Exchange, a Lotus Notes server, or another SMTP mail transport agent such as Sendmail. In many embodiments, mail server 230 will also be capable of receiving e-mail messages. Enterprise hand-held services enhancement server 236 optionally provides an interface between the WHHD 117 and the mail server 230. Among several functions of enterprise HH server 236, when an e-mail message arrives for the user at mail server 230, enterprise HH server 236 pushes that e-mail message out to WHHD 117.

When WHHD 117 transmits an e-mail message, the mail agent 232 of enterprise HH server 236 receives instructions and the contents of the e-mail message from the WHHD 117, as previously described previously with respect to the system 1. Mail agent 232 further responsively calls appropriate API components of the mail server 230 to perform the functions previously described with respect to the system 1.

Mail server 230, enterprise hand-held services enhancement server 236 and mail agent 232 may be realized using one or more suitable programmable computer systems running a commercially available operating system. For example, these items may be realized using commercial server computers having Intel™ IA-32-based processors and running an operating system in the Microsoft Windows Server™ family, such as Windows Server 2003. Other computers and operating systems could also be used. Although some of elements 230, 232, 234, and 236 are depicted as distinct elements and may be realized as such (i.e., using separate server computers), skilled artisans will appreciate that these elements may be refactored or virtualized as necessary to meet expected load.

Thus, these elements could also be realized as different processes running on the same computer or on several computers.

As a further example of how the above-described embodiments may be used, the above methods of resolving message addresses, including group addresses and group names of FIGS. 3-6 and 11, and the related description and methods, can be employed in whole or in part on a system 1, as realized more particularly for example by system 116 of FIGS. 12-13. Consider, for example, an environment in which a mail server 230 of FIG. 13, acting as the message server 5 (FIG. 1), is implemented using the commercially-available DOMINO mail server software. A user may send an email message in the NOTES Native Encrypted encoding format from wireless handheld device 117 (FIG. 12) acting as the client 3 of FIG. 1 with one or more group addresses as a recipient. In at least some versions, in order to accept a message to be encrypted, the DOMINO software requires that each user name be expressed in DOMINO canonical format (e.g. "CN=John Doe/O=Domain"). Groups do not have an address in canonical format. In embodiments such as those described above for offering to a DOMINO mail server (of some versions) a message which is to be encrypted and which includes at least one group as a recipient, each such group is first resolved to user names in DOMINO canonical format. This process may be performed, for example, as generally described in connection with FIGS. 3-6 and 11, with mail agent 232 of FIG. 13 acting as the message agent 15 (FIG. 1), message agent storage 233 of FIG. 13 acting as the user cache 17 (FIG. 1) and group cache (FIG. 1), mail server 230 of FIG. 13 acting as the message server 5, and system file storage units 240 of FIG. 13 and mail server 230 cooperating to provide the source directories 7. However, these functions could be implemented using other architectures without departing from the spirit of the present disclosure.

The cache 17 can, for example, be set to store the cached data in memory or other storage facilities 233 of messaging agent 232 for up to a set amount of time (a default of four hours has been found useful in a commercial embodiment) as mentioned previously for the system 1. Cached entries can also be removed prior to the expiration time if the cache 17 has reached its size limit and the cache 17 needs room for new entries.

Further, as an example, embodiments of the above methods and systems for resolving group names can be implemented utilizing a BLACKBERRY™ environment as provided by Research In Motion Limited of Waterloo, Canada such that, for example, the device 117 is implemented by a BLACKBERRY smartphone, and the mail agent 232 may be implemented as part of a server computer in conjunction with BLACKBERRY ENTERPRISE SERVER software product commercially available from Research In Motion Limited.

In a first aspect an embodiment of this application provides a method of transmitting a message addressed to at least one group address associated with a group. The method includes expanding a group address by looking up one or more user names for members of a group associated with the group address from a source directory; looking up an user address for each of the one or more user names from a user cache comprising a snapshot of information from the source directory including user names mapped to user addresses; addressing the message to each looked up user address; and transmitting the message to each looked up user address.

Expanding a group address by looking up one or more user names for members of a group associated with the group address from a source directory may include resolving the group address to a group name, and looking up, from the source directory, one or more user names for members of the group based on the group name.

Transmitting the message to each looked up user address may include requesting a message server to encrypt the message for each looked up user address; receiving an encrypted message associated with each looked up user address from the message server; and transmitting each encrypted message to each looked up user address.

Where the message is to be encrypted, the method may include looking up, from the source directory, encryption keys for encryption associated with each of the one or more user names; and encrypting the message using the looked up encryption keys prior to transmitting the message to each looked up user address.

The method may include checking in a group cache (20d) to see if the group address has already been looked up for the message prior to a) and stopping the method for the group address if the group address has already been looked up for the message; adding an indication to the group cache (20d) when the group address has been looked up for the message; and adding an indication to the user cache when each of the user names has been looked up for the message.

The method may include looking up a user address associated with a user name from the source directory, if the user address associated with the user name is not found in the user cache in looking up an user address for each of the one or more user names from the user cache; and adding the user address associated with the user name to the user cache for future lookups.

The method may be implemented in a message agent (15, 232).

In a second aspect an embodiment of this application provides a system for resolving addresses of a message. The system includes a source directory comprising a database of group names and associated user names, and user names and associated user addresses, a user cache from the source directory of user names mapped to user addresses, and a message agent configured for looking up one or more user names for members of a group associated with a message address from a source directory, configured for looking up the user addresses for the one or more user names from the user cache, configured for addressing the message to the looked up user addresses, and configured for transmitting the message to the looked up user addresses.

The message agent may be further configured for encryption of the message based on the looked up respective user names prior to transmission of the message to the respective user addresses.

The message agent may be further configured for looking up encryption keys from a source directory 7 of user names and associated encryption keys, the looking up of encryption keys utilizing the respective looked up user names.

The system may further include a group cache for storing an indication when the group name has been looked up for the message; and the message agent may be configured for checking if the group name has already been looked up for the message prior to lookup up the user names from the source directory for the group name, and if the group name has already been looked up for the message stopping processing of the group name; and wherein the message agent may be further configured for adding the indication when the group name has been looked up for the message.

The message agent may be configured for checking if a user name has already been looked up for the message, and if the user name has already been looked up for the message stopping processing of the user name; and the message agent may be further configured for adding the indication to the user cache when the user name has been looked up for the message.

The message agent may be further configured for if the lookup of a user name in the user cache fails then the user name is looked up in a message server 5 for use with the message and the information being looked up for the user name is added to the user cache for future lookups.

In a third aspect an embodiment of the present application provides a method in a mobile device of transmitting a message to be encrypted, the message addressed to at least one group address associated with a group. The method includes receiving an instruction to compose a message to a group address; receiving an instruction to encrypt the message; receiving an instruction to send the message to a message agent (15, 232); and transmitting the message to the message agent with an instruction to encrypt the message, wherein the message is subsequently encrypted and transmitted to each user address associated with members of the group.

The message may be encrypted at the message agent.

In a fourth aspect an embodiment of the present application provides a method of resolving message addresses of a message to be encrypted. The method includes looking up, from a user cache, a user address associated with a message address, and if the lookup returns that the message address is unresolved which indicates that the message address had been previously looked up as a user name in a source directory but was not found, treat the message address as a group address, by: a) looking up, from the source directory, a group name associated with the message address and one or more user names for members of the group associated with the group name; looking up an user address for each of the one or more user names from the user cache; if the user address associated with the user name is not found in the user cache, then looking up the user address associated with the user name from the source directory, and if the user address is returned then adding the user address associated with the user name to the user cache for future lookups; if the user address associated with the user name is not found in the source directory then adding the user name as an unresolved message address in the user cache and treat the user name as a group address, returning to a); and the method further includes b) looking up, from the user cache or the source directory, encryption keys for encryption associated with each of the one or more user names; c) addressing the message to the looked up user addresses and encrypting the message using the looked up encryption keys; and d) transmitting the message to each looked up user address.

According to a fifth aspect an embodiment of this application provides a method of resolving addresses of a message. The method includes looking up, from a source directory, a group name associated with a message address of the message and returning one or more user names associated with the group name; looking up through a cache, comprising a snapshot of information from the source directory comprising of user names mapped to user addresses; and addressing the message to each looked up user address.

The method wherein the message is to be encrypted may include transmitting the message with each looked up user address for encryption based on the respective looked up user names prior to transmission of the message to each respective user addresses.

The method may include requesting transmission of the message to each respectively looked up user address.

The method wherein the message is to be encrypted may include looking up encryption keys from a source directory of user names and associated encryption keys, the looking up of encryption keys utilizing the respective looked up user names.

The method may include checking to see if a group name has already been looked up for the message. The method may include stopping the method for a group name if the group name has already been looked up for the message.

The method may include checking to see if a user name has already been looked up for the message. The method may include stopping the method for a user name if the user name has already been looked up for the message.

The method may include adding an indication of when a group name has been looked up for a message. The method may include adding an indication of when a user name has been looked up for a message.

The method may include repeating the method for additional group names of the message.

The method may include if the lookup of a user name in the cache fails then the user name is looked up from the source directory for use with the message and the information being looked up for the user name is added to the cache for future lookups.

The method may include recursively applying the method to resolve nested group names.

The message may first be transmitted for resolution by a message client.

In a sixth aspect an embodiment of this application provides a system for resolving addresses of a message to be encrypted. The system includes a source directory comprising a database of group names and associated user names, and user names and associated user addresses, a cache from the source directory of user names mapped to user addresses, and a message agent configured for looking up the user names from the source directory for a group name of the message, looking up the user addresses for the user names, and addressing the message to the user addresses.

The system may further include a message agent configured to carry out the various steps of the first aspect. The message agent may be configured for looking up in the source directory through a message server. The message agent may be configured for looking up encryption keys from a source directory through a message server.

In a seventh aspect an embodiment of this application provides a system for resolving addresses of a message to be encrypted. The system includes a message agent, a message server, a cache, and a source directory. The message agent and cache are operatively connected. The message server and source are operatively connected. The message agent and the message server are operatively connected. The message agent is adapted to request the message server to look up user names from the source directory for a group name of the message. The message agent is adapted to look up the user addresses for the user names from the cache and to address the message to the user addresses. The method of any of the above claims wherein the message is first transmitted for resolution by a message client.

In an eighth aspect an embodiment of this application provides a method of resolving addresses of a message to be encrypted, the method comprising the steps of looking up, from a source directory, user names associated with a group name of the message, looking up an user address for each of the looked up user names, looking up encryption keys from a cache of user names and associated encryption keys, the looking up of encryption keys utilizing the respective looked up user names, and addressing the message to the looked up user addresses and encrypting the message using the looked up encryption keys.

Other aspects and further details of the above aspects will be evident from the description provided above and the associated drawing FIGS.

The description of example embodiments of aspects of the application does not limit the implementation thereof to any particular computer programming language or system architecture. The aspects are not limited to any particular operating system, mobile device architecture, or computer programming language. Moreover, although some of the embodiments described below include mobile devices, the aspects are not limited to mobile devices; rather, it may be embodied within a variety of user devices or terminals, including handheld devices, mobile telephones, personal digital assistants (PDAs), personal computers, audio-visual terminals, televisions, and other devices. One skilled in the art will appreciate that messaging applications can be installed on most existing implementations of these user devices and terminals.

One of skill in the art will appreciate that the methods described herein may be used with the apparatuses described herein, but could also be used with other apparatuses without departing from the spirit of the invention. Accordingly, some primary steps are presented in a generalized form that does not rely on the particular apparatuses described herein. It is noted in the description of certain steps and substeps that such steps may be performed by specific elements of the apparatuses; however, the association of steps and apparatuses is done by way of example but not limitation, and it is to be understood that these steps could be performed by other apparatuses. Moreover, the term "step" is used herein to refer to both the general steps associated with the methods and to more detailed substeps which may be comprised as part of a more general step. Some steps are optional. Optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

The steps or operations described herein are just for example. There may be many variations to these steps or operations without departing from the spirit of the invention. For instance, the steps may be performed in a differing order, or steps may be added, deleted, or modified. Parts of one embodiment may be used in another embodiment without requiring all of the steps of any one embodiment.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

The invention claimed is:

1. A method of resolving message addresses of a message to be encrypted, the method comprising:
 a) looking up, from a user cache, a user address associated with a message address, and determining that the lookup returns that the message address is unresolved, thereby indicating that the message address had been previously looked up as a user name in a source directory but was not found, treating the message address as a group address, by:
  a. looking up, from the source directory, a group name associated with the message address and one or more user names for members of the group associated with the group name;
  b. looking up an user address for each of the one or more user names from the user cache;
  c. if the user address associated with the user name is not found in the user cache, then looking up the user address associated with the user name from the source directory, and if the user address is returned then adding the user address associated with the user name to the user cache for future lookups;
  d. if the user address associated with the user name is not found in the source directory then adding the user name as an unresolved message address in the user cache and treat the user name as a group address, returning to a);
 b) looking up, from the user cache or the source directory, encryption keys for encryption associated with each of the one or more user names;
 c) addressing the message to the looked up user addresses and encrypting the message using the looked up encryption keys; and
 d) transmitting the message to each looked up user address.

2. A method of transmitting a message addressed to at least one group address associated with a group, the method comprising:
 a) expanding, by a message agent, a group address by looking up one or more user names for members of a group associated with the group address from a source directory;
 b) looking up, by the message agent, an user address for each of the one or more user names from a user cache comprising a snapshot of information from the source directory including user names mapped to user addresses;
 c) addressing, by the message agent, the message to each looked up user address; and
 d) transmitting, by the message agent, the message to each looked up user address.

3. The method of claim 2 wherein expanding a group address by looking up one or more user names for members of a group associated with the group address from a source directory comprises:
 resolving the group address to a group name, and
 looking up, from the source directory, one or more user names for members of the group based on the group name.

4. The method of claim 2 wherein transmitting the message to each looked up user address comprises:
 requesting a message server to encrypt the message for each looked up user address;
 receiving an encrypted message associated with each looked up user address from the message server;
 transmitting each encrypted message to each looked up user address.

5. The method of claim 2 wherein the message is to be encrypted, the method further comprising:
  looking up, from the source directory, encryption keys for encryption associated with each of the one or more user names; and
  encrypting the message using the looked up encryption keys prior to transmitting the message to each looked up user address.

6. The method of claim 2 further comprising:
  checking in a group cache to see if the group address has already been looked up for the message prior to a) and stopping the method for the group address if the group address has already been looked up for the message;
  adding an indication to the group cache when the group address has been looked up for the message; and
  adding an indication to the user cache when each of the user names has been looked up for the message.

7. The method of claim 2 further comprising:
  looking up a user address associated with a user name from the source directory, if the user address associated with the user name is not found in the user cache in b);
  adding the user address associated with the user name to the user cache for future lookups.

8. The method of claim 3 wherein transmitting the message to each looked up user address comprises:
  requesting a message server to encrypt the message for each looked up user address;
  receiving an encrypted message associated with each looked up user address from the message server;
  transmitting each encrypted message to each looked up user address.

9. The method of claim 3 wherein the message is to be encrypted, the method further comprising:
  looking up, from the source directory, encryption keys for encryption associated with each of the one or more user names; and
  encrypting the message using the looked up encryption keys prior to transmitting the message to each looked up user address.

10. The method of claim 3 further comprising:
  checking in a group cache to see if the group address has already be looked up for the message prior to a) and stopping the method for the group address if the group address has already been looked up for the message;
  adding an indication to the group cache when the group address has been looked up for the message; and
  adding an indication to the user cache when each of the user names has been looked up for the message.

11. The method of claim 3 further comprising:
  looking up a user address associated with a user name from the source directory, if the user address associated with the user name is not found in the user cache in b);
  adding the user address associated with the user name to the user cache for future lookups.

12. A system for resolving addresses of a message, the system comprising:
  a) a source directory comprising a database of group names and associated user names, and user names and associated user addresses,
  b) a user cache from the source directory of user names mapped to user addresses,
  c) a message agent configured for looking up one or more user names for members of a group associated with a message address from a source directory, configured for looking up the user addresses for the one or more user names from the user cache, configured for addressing the message to the looked up user addresses, and configured for transmitting the message to the looked up user addresses.

13. The system of claim 12 wherein the message agent is further configured for encryption of the message based on the looked up respective user names prior to transmission of the message to the respective user addresses.

14. The system of claim 9 wherein the message agent is further configured for looking up encryption keys from a source directory of user names and associated encryption keys, the looking up of encryption keys utilizing the respective looked up user names.

15. The system of claim 12 further comprising:
  a group cache for storing an indication when the group name has been looked up for the message;
  wherein the message agent is configured for checking if the group name has already been looked up for the message prior to lookup up the user names from the source directory for the group name, and if the group name has already been looked up for the message stopping processing of the group name; and
  wherein the message agent is further configured for adding the indication when the group name has been looked up for the message.

16. The system of claim 12 wherein the message agent is configured for checking if a user name has already be looked up for the message, and if the user name has already been looked up for the message stopping processing of the user name; and wherein the message agent is further configured for adding an indication to the user cache when the user name has been looked up for the message.

17. The system of claim 12 wherein the message agent is further configured for if the lookup of a user name in the user cache fails then the user name is looked up in a message server for use with the message and the information being looked up for the user name is added to the user cache for future lookups.

* * * * *